(12) United States Patent
Chen et al.

(10) Patent No.: US 11,712,778 B2
(45) Date of Patent: Aug. 1, 2023

(54) CHEMICAL MECHANICAL PLANARIZATION TOOL

(71) Applicant: Taiwan Semiconductor Manufacturing Company, Ltd., Hsinchu (TW)

(72) Inventors: Tung-Kai Chen, New Taipei (TW); Shang-Yu Wang, Changhua County (TW); Wan-Chun Pan, Hsinchu (TW); Zink Wei, Hsinchu (TW); Hui-Chi Huang, Zhubei (TW); Kei-Wei Chen, Tainan (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 1013 days.

(21) Appl. No.: 16/550,061

(22) Filed: Aug. 23, 2019

(65) Prior Publication Data

US 2021/0053184 A1  Feb. 25, 2021

(51) Int. Cl.
| | |
|---|---|
| *B24B 49/12* | (2006.01) |
| *G01N 21/64* | (2006.01) |
| *B24B 53/017* | (2012.01) |
| *B24B 37/20* | (2012.01) |
| *B24B 37/12* | (2012.01) |

(52) U.S. Cl.
CPC .............. *B24B 49/12* (2013.01); *B24B 37/12* (2013.01); *B24B 37/20* (2013.01); *B24B 53/017* (2013.01); *G01N 21/6456* (2013.01)

(58) Field of Classification Search
CPC ......... B24B 37/14; B24B 37/24; B24B 37/34; B24B 41/068; B24B 53/00; B24B 53/017; B24D 3/02; B24D 3/342; B24D 3/344; B24D 11/02; B24D 18/0054; B24D 2205/00
See application file for complete search history.

(56) References Cited

U.S. PATENT DOCUMENTS

| | | | | |
|---|---|---|---|---|
| 4,250,382 | A  * | 2/1981 | Libby | ................... G01N 21/64 427/10 |
| 6,238,487 | B1 | 5/2001 | Jenkins et al. | |
| 8,313,799 | B2 * | 11/2012 | Lauria | ................ G01N 21/8422 356/417 |
| 9,138,861 | B2 | 9/2015 | Wu et al. | |
| 9,305,851 | B2 | 4/2016 | Liu et al. | |

(Continued)

FOREIGN PATENT DOCUMENTS

| | | |
|---|---|---|
| CN | 1270701 A | 10/2000 |
| CN | 1402313 A | 3/2003 |

(Continued)

*Primary Examiner* — Joel D Crandall
(74) *Attorney, Agent, or Firm* — Slater Matsil, LLP

(57) ABSTRACT

A method of operating a chemical mechanical planarization (CMP) tool includes attaching a polishing pad to a first surface of a platen of the CMP tool using a glue; removing the polishing pad from the platen, wherein after removing the polishing pad, residue portions of the glue remain on the first surface of the platen; identifying locations of the residue portions of the glue on the first surface of the platen using a fluorescent material; and removing the residue portions of the glue from the first surface of the platen.

20 Claims, 7 Drawing Sheets

(56) References Cited

U.S. PATENT DOCUMENTS

| | | | |
|---|---|---|---|
| 2002/0034928 A1* | 3/2002 | Doan | ............... B24D 9/085 451/285 |
| 2003/0139048 A1 | 7/2003 | Wong et al. | |
| 2007/0066187 A1 | 3/2007 | Yang et al. | |
| 2007/0298692 A1 | 12/2007 | Mavliev et al. | |
| 2015/0118944 A1 | 4/2015 | Kosuge et al. | |

FOREIGN PATENT DOCUMENTS

| | | | | |
|---|---|---|---|---|
| CN | 1553945 A | | 12/2004 | |
| CN | 101720346 A | | 6/2010 | |
| CN | 103252721 A | | 8/2013 | |
| CN | 103945984 A | | 7/2014 | |
| CN | 104647194 A | | 5/2015 | |
| CN | 104968472 A | | 10/2015 | |
| CN | 110091249 A | | 8/2019 | |
| EP | 0850726 A1 | * | 7/1998 | |
| JP | 3175511 B2 | * | 6/2001 | |
| KR | 20050103399 A | * | 5/2007 | |
| WO | 03022951 A1 | | 3/2003 | |
| WO | WO-2008153659 A2 | * | 12/2008 | ......... G01N 21/8422 |

\* cited by examiner

CHEMICAL MECHANICAL PLANARIZATION TOOL

BACKGROUND

Generally, semiconductor devices comprise active components, such as transistors, formed on a substrate. Any number of interconnect layers may be formed over the substrate connecting the active components to each other and to outside devices. The interconnect layers are typically made of low-k dielectric materials comprising metallic trenches/vias.

As the layers of a device are formed, planarization processes may be performed to planarize the layers to facilitate formation of subsequent layers. For example, the formation of metallic features in the substrate or in a metal layer may cause uneven topography. This uneven topography may create difficulties in the formation of subsequent layers. For example, uneven topography may interfere with the photolithographic process commonly used to form various features in a device. Therefore, it may be advantageous to planarize the surface of the device after various features or layers are formed.

Chemical Mechanical Polishing (CMP) is a common practice in the formation of integrated circuits. Typically, CMP is used for the planarization of semiconductor wafers. CMP takes advantage of the synergetic effect of both physical and chemical forces for the polishing of wafers. It is performed by applying a load force to the back of a wafer while the wafer rests on a polishing pad. A polishing pad is placed against the wafer. Both the polishing pad and the wafer are then rotated while a slurry containing both abrasives and reactive chemicals is passed therebetween. CMP is an effective way to achieve global planarization of wafers.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 3 illustrates a cross-sectional view showing a polishing pad being attached to a platen with residue glue disposed in between.

DETAILED DESCRIPTION

Figure 1:
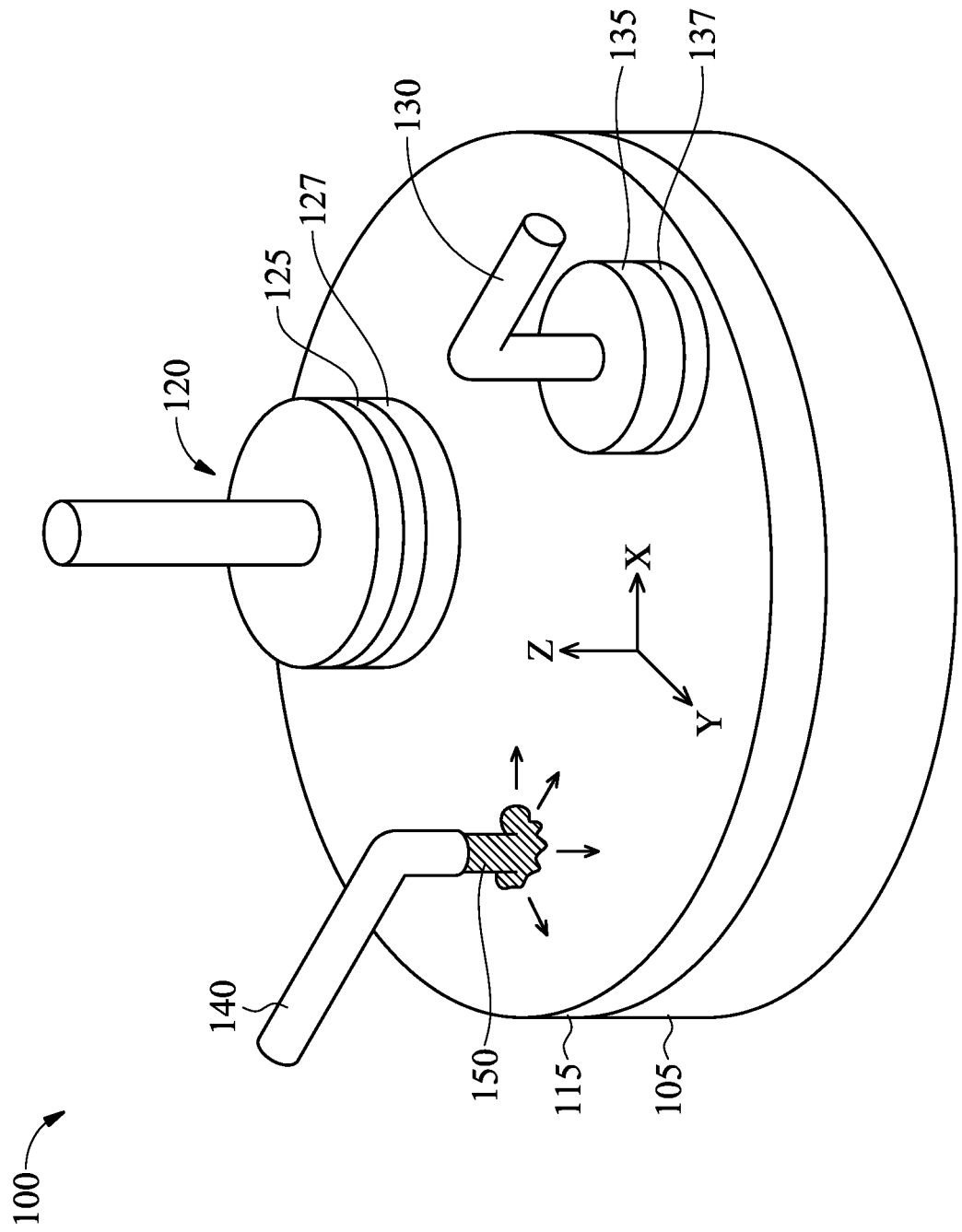
FIG. 1 illustrates a perspective view of a chemical mechanical planarization apparatus, in accordance with an embodiment.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. Through the description herein, unless other specified, the same reference numeral in different figures refers to the same or similar component.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Various representative embodiments are described with respect to operating a CMP tool, and in particular, identifying and removing residue glue left on the platen during replacement of the polishing pad. In an embodiment, a polishing pad of a CMP tool is attached to an upper surface of a platen of the CMP tool by a glue that comprises a fluorescent material. During a polishing pad replacement process, the worn out polishing pad is removed from the platen, and residue portions of the glue may remain on the upper surface of the platen. A first light (e.g., a UV light) is projected on the upper surface of the platen, which activates the fluorescent material in the residue portions of the glue to emit a second light (e.g., a visible light). Therefore, locations of the residue portions of the glue are easily seen or detected, and a spot-cleaning process is performed to remove the residue portions of the glue. In another embodiment, the upper surface of the platen is coated by a fluorescent material. The polishing pad is glued to the coating at the upper surface of the platen. During a polishing pad replacement process, after removal of the worn out polishing pad, residue portions of the glue may remain on the upper surface of the platen. Next, a first light (e.g., a UV light) is projected on the coating, and the fluorescent material in the coating is activated to emit a second light (e.g., a visible light). Areas of the coating with the residue portions of the glue exhibit different light patterns (e.g., second light being darker, or no second light) from other areas of the coating without the residue portions of the glue. The locations of the residue portions of the glue are therefore easily identified, and the residue portions of the glue may be removed by a spot-cleaning process.

Chemical mechanical planarization (CMP) is a method of planarizing features produced in the manufacture of semiconductor devices. The process uses an abrasive material in a reactive chemical slurry in conjunction with a polishing pad. The polishing pad typically has a greater diameter than that of the semiconductor wafer. The pad and wafer are pressed together during the CMP process. The process removes material and tends to even out irregular topography, making the wafer flat or substantially planar. This prepares the wafer for the formation of additional overlying circuit elements. For example, chemical mechanical planarization can bring an entire wafer surface within a given depth of field of a photolithography system. Typical depth-of-field specifications are on the order of, e.g., angstroms. In some implementations, chemical mechanical planarization may also be employed to selectively remove material based on its location on the wafer.

In a CMP process, a wafer is placed in a carrier head (also referred to as a carrier), where the wafer is held in place by a retaining ring. The carrier head and the wafer are then rotated as downward pressure is applied to the wafer to press against the polishing pad. A reactive chemical solution is dispensed on a contacting surface of the polishing pad to aid planarization. The surface of a wafer may thus be planarized using a combination of both mechanical and chemical mechanisms.

FIG. 1 illustrates a perspective view of a chemical mechanical planarization apparatus 100 in accordance with some embodiments. The chemical mechanical planarization apparatus 100 includes a platen 105 and a polishing pad 115 over (e.g., glued to) the platen 105. In some embodiments, the polishing pad 115 includes a single layer or a composite layer of materials, such as felts, polymer impregnated felts, microporous polymer films, microporous synthetic leathers, filled polymer films, unfilled textured polymer films, combinations thereof, or the like. Representative polymers include polyurethane, polyolefins, or the like.

As illustrated in FIG. 1, a polisher head 120 is placed over the polishing pad 115. The polisher head 120 includes a carrier 125 and a retainer ring 127. The retainer ring 127 is mounted to the carrier 125 using mechanical fasteners (e.g., screws, or the like) or other suitable attachment means. During a representative chemical mechanical planarization process, a workpiece (e.g., a semiconductor wafer; not shown in FIG. 1 but illustrated and described below with respect to FIG. 2B) is placed within the carrier 125 and is held by the retainer ring 127. In some embodiments, the retainer ring 127 has a substantially annular shape with a substantially hollow center. The workpiece is placed in the center of the retainer ring 127 such that the retainer ring 127 holds the workpiece in place during a chemical mechanical planarization process. The workpiece is positioned such that a surface to be polished faces in a direction (for example, downward) towards the polishing pad 115. The carrier 125 is configured to apply downward force or pressure urging the workpiece into contact with the polishing pad 115. The polisher head 120 is configured to rotate the workpiece over the polishing pad 115 during the chemical mechanical planarization process, thereby imparting mechanical abrading action to affect planarization or polishing of a contacting surface of the workpiece.

In some embodiments, the chemical mechanical planarization apparatus 100 includes a slurry dispenser 140 configured to deposit a slurry 150 onto the polishing pad 115. The platen 105 is configured to rotate, causing the slurry 150 to be distributed between the workpiece and the platen 105 through a plurality of grooves in the retainer ring 127. The plurality of grooves may extend from an outer sidewall of the retainer ring 127 to an inner sidewall of the retainer ring 127.

The composition of the slurry 150 may depend on which types of material are to be polished or removed. For example, the slurry 150 may comprise a reactant, an abrasive, a surfactant, and a solvent. The reactant may be a chemical, such as an oxidizer or a hydrolyzer, which chemically reacts with a material of the workpiece in order to assist the polishing pad 115 in abrading or removing material. In some embodiments in which the material to be removed includes, e.g., tungsten, the reactant may be, e.g., hydrogen peroxide, $Cr_2O_7$, $MnO_4$, $OsO_4$; although other suitable reactants, such as hydroxylamine, periodic acid, other periodates, iodates, ammonium persulfate, peroxomonosulfates, peroxymonosulfuric acid, perborates, malonamide, combinations of same, or the like, that are configured to aid removal of material may be alternatively, conjunctively, or sequentially employed. In other embodiments, other reactants may be used to remove other types of materials. For example, in embodiments in which a material to be removed includes, e.g., an oxide, the reactant may comprise, e.g., nitric acid ($HNO_3$), potassium hydroxide (KOH), ammonium hydroxide ($NH_4OH$), combinations thereof, or the like.

The abrasive may include any suitable particulate that, in conjunction with the relative mechanical movement of the polishing pad 115, is configured to polish or planarize the workpiece. In some embodiments, the abrasive includes colloidal aluminum oxide. In some embodiments, the abrasive includes silicon oxide, aluminum oxide, cerium oxide, polycrystalline diamond, polymer particles (e.g., polymethacrylate, or the like), combinations thereof, or the like.

The surfactant may be utilized to help disperse the reactant(s) and abrasive(s) within the slurry 150, and to prevent (or otherwise reduce the occurrence of) agglomeration of the abrasive during the chemical mechanical planarization process. In some embodiments, the surfactant may include polyethylene glycol (PEG), polyacrylic acid, sodium salts of polyacrylic acid, potassium oleate, sulfosuccinates, sulfosuccinate derivatives, sulfonated amines, sulfonated amides, sulfates of alcohols, alkylanyl sulfonates, carboxylated alcohols, alkylamino propionic acids, alkyliminodipropionic acids, combinations thereof, or the like. However, such representative embodiments are not intended to be limited to the recited surfactants. Those skilled in the art will appreciate that any suitable surfactant may be alternatively, conjunctively, or sequentially employed.

In some embodiments, the slurry 150 includes a solvent that may be utilized to combine the reactant(s), the abrasive (s), and the surfactant(s), and allow the mixture to be moved and dispersed onto the polishing pad 115. In some embodiments, the solvent includes, e.g., deionized water (DIW), alcohol, or an azeotropic mixture thereof; however, other suitable solvent(s) may be alternatively, conjunctively, or sequentially employed.

Additionally, if desired, other additives may also be added in order to help control or otherwise benefit the CMP process. For example, a corrosion inhibitor may be added in order to help control the corrosion. In one particular embodiment the corrosion inhibitor may be an amino acid such as glycine. However, any suitable corrosion inhibitor may be utilized.

In another embodiment, a chelating agent(s) is added to the slurry 150. The chelating agent may be an agent such as ethylenediaminetetraacetic acid (EDTA), $C_6H_8O_7$, $C_2H_2O_4$, combinations thereof, or the like. However, any suitable chelating agent may be utilized.

In yet another embodiment, the slurry 150 includes a pH adjuster(s) in order to control the pH value of the slurry 150. For example, a pH adjuster such as HCl, $HNO_3$, $H_3PO_4$, $C_2H_2(COOH)_2$, KOH, $NH_4OH$, combinations thereof, or the like, may be added to the slurry 150 in order to adjust the pH value of the slurry 150 up or down.

Additionally, other additives may also be added to help control and manage the CMP process. For example, downforce enhancers (e.g., an organic compound), polish rate inhibitors, or the like may also be added. Any suitable additives which may be useful to the polishing process may be utilized, and all such additives are fully intended to be included within the scope of the embodiments.

In some embodiments, the chemical mechanical planarization apparatus 100 includes a pad conditioner 137 attached to a pad conditioner head 135. The pad conditioner head 135 is configured to rotate the pad conditioner 137 over the polishing pad 115. The pad conditioner 137 is mounted to the pad conditioner head 135 using mechanical fasteners (e.g., screws, or the like) or by other suitable attachment means. A pad conditioner arm 130 is attached to the pad conditioner head 135, and is configured to move the pad conditioner head 135 and the pad conditioner 137 in a sweeping motion across a region of the polishing pad 115. In some embodiments, the pad conditioner head 135 is mounted to the pad conditioner arm 130 using mechanical fasteners (e.g., screws, or the like) or by other suitable attachment means. The pad conditioner 137 comprises a substrate over which an array of abrasive particles is bonded. The pad conditioner 137 removes built-up wafer debris and excess slurry 150 from the polishing pad 115 during the CMP processing. In some embodiments, the pad conditioner 137 also acts as an abrasive for the polishing pad 115 to renew, or create a desired texture (such as, e.g., grooves, or the like) against which the workpiece may be polished.

As illustrated in FIG. 1, the chemical mechanical planarization apparatus 100 has a single polisher head (e.g., 120) and a single polishing pad (e.g., 115). However, in other embodiments, the chemical mechanical planarization apparatus 100 may have multiple polisher heads or multiple polishing pads. In some embodiments in which the chemical mechanical planarization apparatus 100 has multiple polisher heads and a single polishing pad, multiple workpieces (e.g., semiconductor wafers) may be polished at a same time. In other embodiments in which the chemical mechanical planarization apparatus 100 has a single polisher head and multiple polishing pads, a chemical mechanical planarization process may include a multi-step process. In such embodiments, a first polishing pad may be used for bulk material removal from a wafer, a second polishing pad may be used for global planarization of the wafer, and a third polishing pad may be used, e.g., to buff a surface of the wafer. In some embodiments, different slurry compositions may be used for different stages of chemical mechanical planarization processing. In still other embodiments, a same slurry composition may be used for all chemical mechanical planarization stages.

Figure 2A:
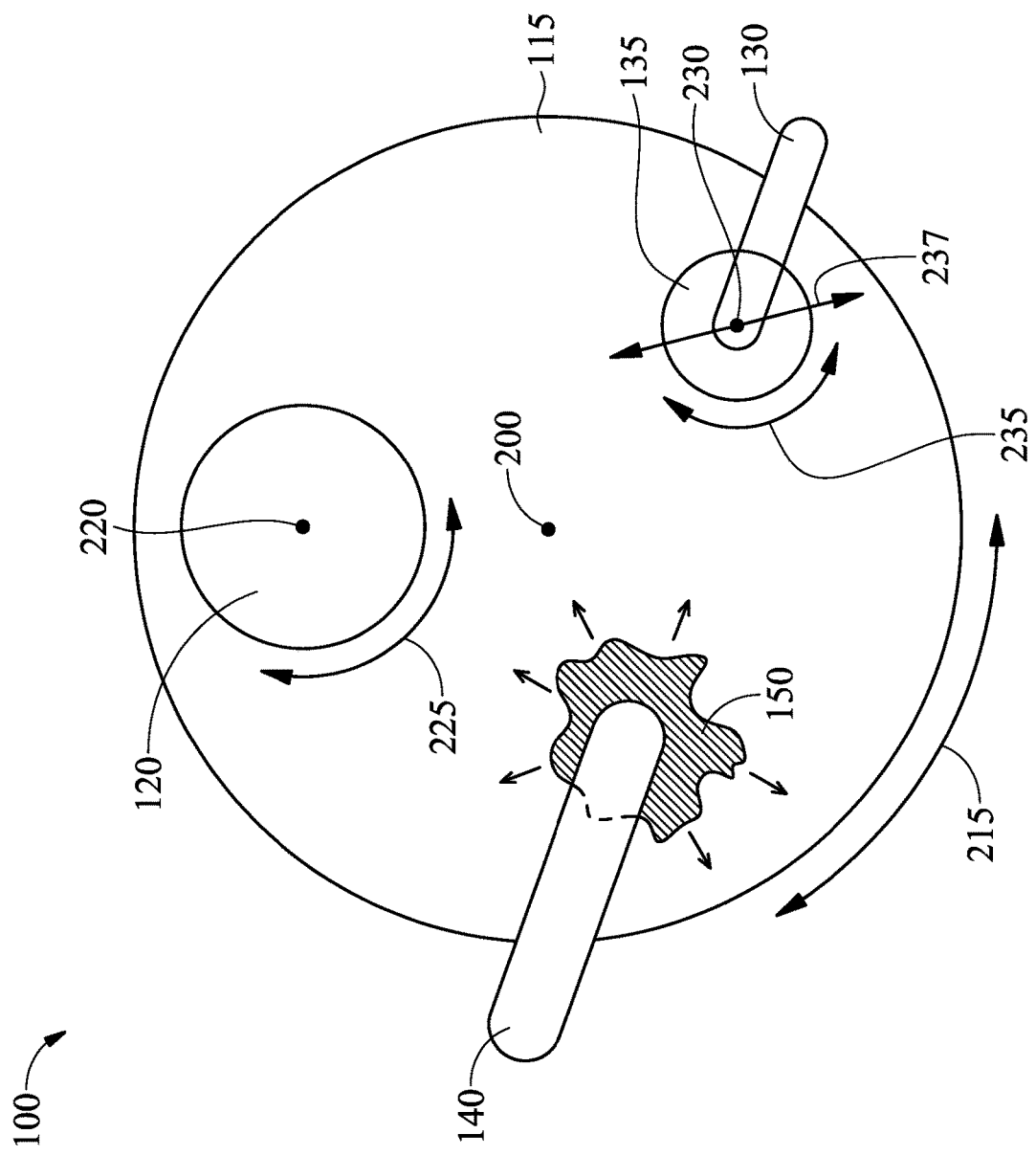
FIG. 2A illustrates a top view of the chemical mechanical planarization apparatus of FIG. 1, in accordance with an embodiment.

FIG. 2A illustrates a top view (or plan view) of the chemical mechanical planarization apparatus 100 of FIG. 1, in accordance with some embodiments. The platen 105 (located beneath the polishing pad 115 in FIG. 2A) is configured to rotate in a clockwise or a counter-clockwise direction, indicated by a double-headed arrow 215 around an axis extending through a centrally-disposed point 200, which is a center point of the platen 105. The polisher head 120 is configured to rotate in a clockwise or a counter-clockwise direction, indicated by a double-headed arrow 225 around an axis extending through a point 220, which is a center point of the polisher head 120. The axis through the point 200 is parallel to the axis through the point 220. In the illustrated embodiment, the axis through the point 200 is spaced apart from the axis through the point 220. The pad conditioner head 135 is configured to rotate in a clockwise or a counter-clockwise direction, indicated by a double-headed arrow 235 around an axis extending through a point 230, which is a center point of the pad conditioner head 135. The axis through the point 200 is parallel to the axis through the point 230. The pad conditioner arm 130 is configured to move the pad conditioner head 135 in an effective arc during rotation of the platen 105, as indicated by a double-headed arrow 237.

Figure 2B:
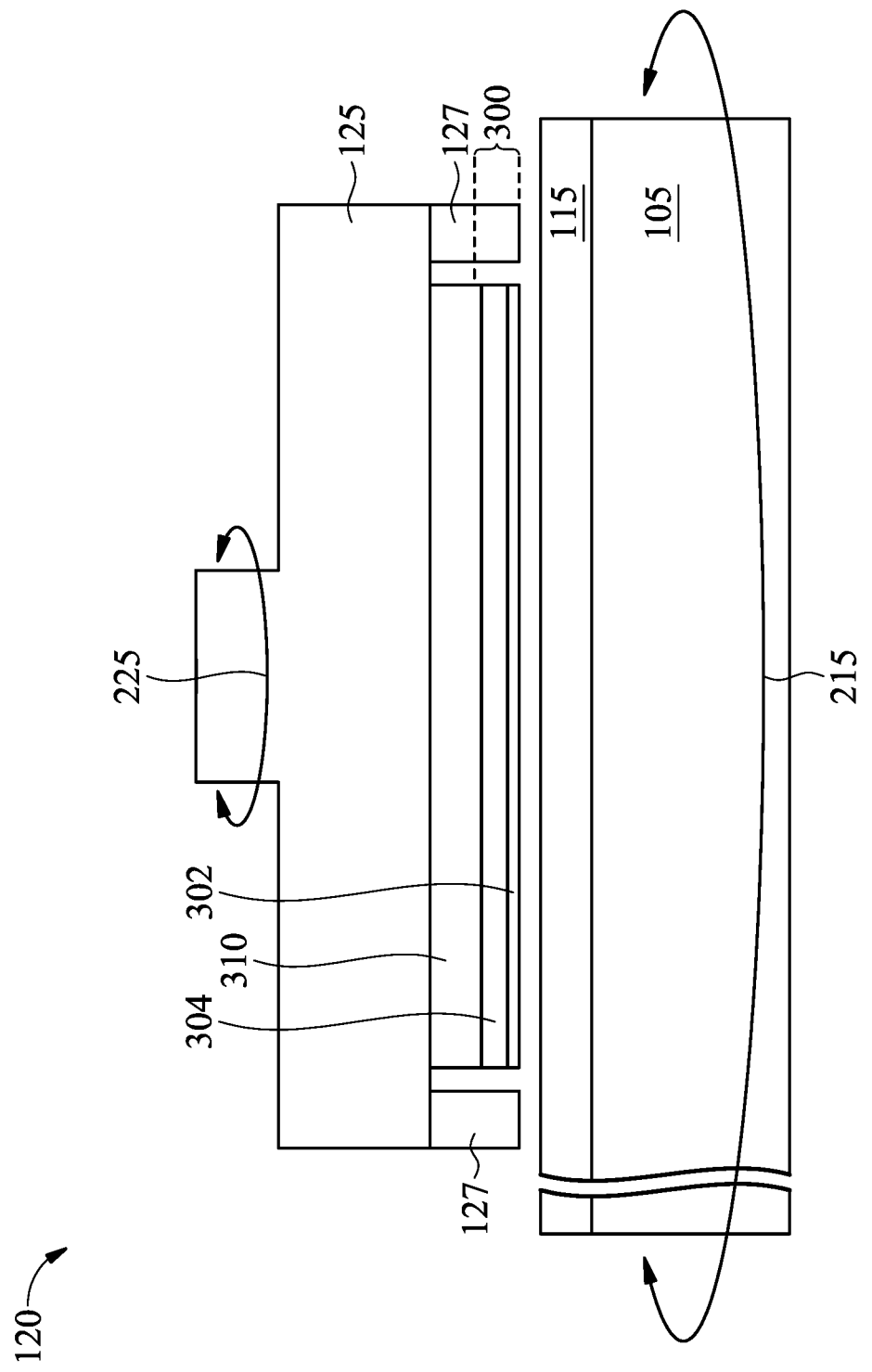
FIG. 2B illustrates a cross-sectional view of a polisher head, in accordance with an embodiment.

FIG. 2B illustrates a cross-sectional view of the polisher head 120, in accordance with some embodiments. The carrier 125 includes a membrane 310 configured to interface with a wafer 300 during the CMP process. In some embodiments, the chemical mechanical planarization apparatus 100 includes a vacuum system coupled to the polisher head 120, and the membrane 310 is configured to pick up and hold the wafer 300 onto the membrane 310 using, e.g., vacuum suction.

In some embodiments, the wafer 300 is a semiconductor wafer comprising, for example, a semiconductor substrate (e.g., comprising silicon, a III-V semiconductor material, or the like), active devices (e.g., transistors, or the like) formed in or on the semiconductor substrate, and various interconnect structures. Representative interconnect structures may include conductive features, which electrically connect the active devices to form functional circuits. In various embodiments, the CMP process may be applied to the wafer 300 during any stage of manufacture in order to planarize features or otherwise remove material (e.g., dielectric material, semiconductor material, conductive material, or the like) of the wafer 300. The wafer 300 may include any subset of the above-identified features, as well as other features.

In the example of FIG. 2B, the wafer 300 comprises bottommost layer(s) 305 and overlying layer(s) 307. The bottommost layer 305 is subjected to polishing/planarization during a CMP process. In some embodiments in which the bottommost layer 305 comprises tungsten, the bottommost layer 305 may be polished to form, e.g., contact plugs contacting various active devices of the wafer 300. In embodiments in which the bottommost layer 305 comprises copper, the bottommost layer 305 may be polished to form, e.g., various interconnect structures of the wafer 300. In embodiments in which the bottommost layer 305 comprises a dielectric material, the bottommost layer 305 may be polished to form, e.g., shallow trench isolation (STI) structures on the wafer 300.

In some embodiments, the bottommost layer 305 may have a non-uniform thickness (e.g., exhibiting local or global topological variation of an exposed surface of the bottommost layer 305) resulting from process variations experienced during deposition of the bottommost layer 305. For example, in an embodiment in which the bottommost layer 305 being planarized comprises tungsten, the bottommost layer 305 may be formed by depositing tungsten into an opening through a dielectric layer using a chemical vapor deposition (CVD) process. Due to CVD process variations or other underlying structures, the bottommost layer 305 may have a non-uniform thickness.

In some embodiments, a thickness profile of the bottommost layer 305 may be measured using ellipsometry, interferometry, reflectometry, picosecond ultrasonics, atomic force microscopy (AFM), scanning tunneling microscopy (STM), scanning electron microscopy (SEM), transmission electron microscopy (TEM), or the like. In some embodiments, a thickness measurement apparatus (not shown) may be external to the chemical mechanical planarization apparatus 100, and a thickness profile of the bottommost layer 305 may be measured or otherwise determined before loading the wafer 300 into the chemical mechanical planarization apparatus 100. In other embodiments, a thickness measurement apparatus may be a part of the chemical mechanical planarization apparatus 100, and a thickness profile of the bottommost layer 305 may be measured or otherwise determined after loading the wafer 300 into the chemical mechanical planarization apparatus 100.

After measurement, the bottommost layer 305 may be planarized by the chemical mechanical planarization apparatus 100. In a particular embodiment the polisher head 120 may be lowered such that the bottommost layer 305 of the wafer 300 is in physical contact with the polishing pad 115. Additionally, the slurry 150 is also introduced onto the polishing pad 115, such that the slurry 150 will come into contact with the exposed surfaces of the bottommost layer 305. The surface (e.g., the bottommost layer 305) of the wafer 300 may thus be planarized using a combination of both mechanical and chemical forces.

As described above, the polishing pad 115 is glued to the upper surface of the platen 105 by a glue layer. After extended use, the polishing pad 115 may eventually wear out and may need to be replaced. To replace the polishing pad 115, the worn-out polishing pad 115 is removed from the platen 105, e.g., by mechanically peeling off the worn-out polishing pad 115 from the platen 105. Thereafter, a new polishing pad 115 is glued to the upper surface of the platen 105.

Figure 3:
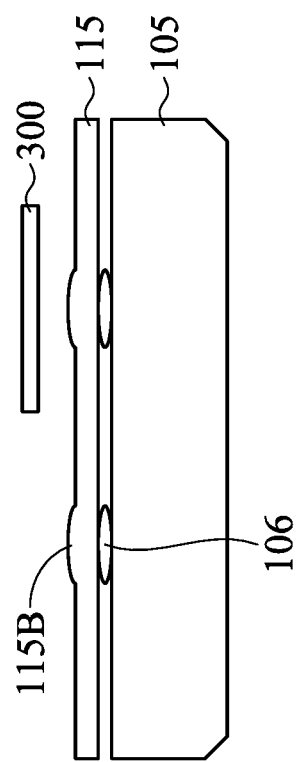

When the worn-out polishing pad 115 is removed, portions of the old glue layer, which was between the worn-out polishing pad 115 and the platen 105 before the removal of the worn-out polishing pad 115, may be left on the upper surface of the platen 105. For ease of discussion, these residue portions of the glue layer may be referred to as residue glue hereinafter. The residue glue, if not removed from the upper surface of the platen 105 before attaching the new polishing pad, may push up portions of the new polishing pad (e.g., portions directly over the residue glue), thereby reducing the uniformity (e.g., planarity) of the new polishing pad, which in turn may cause reduced planarity of the workpiece being polished by the new polishing pad. FIG. 3 and the discussion thereof illustrate the above issue related with the residue glue.

FIG. 3 illustrates a cross-sectional view showing a new polishing pad 115 being attached to the platen 105 with residue glue 106 disposed on the upper surface of the platen 105. In some embodiments, the polishing pad 115 comprises a material such as polyurethane, and therefore, may deform slightly when being attached to the upper surface of the platen 105 with the residue glue 106 disposed in between. As illustrated in FIG. 3, the upper surface of the polishing pad 115 may have non-flat regions 115B (e.g., bumps), due to the underlying residue glue 106. The non-flat regions 115B may reduce planarity of the polishing pad 115 and may negatively affect the polishing result (e.g., planarity) for the wafer 300. Note that to clearly illustrate the residue glue 106, FIG. 3 shows a gap between the polishing pad 115 and the platen 105. One skilled in the art will readily appreciate that the gap is an exaggeration, and there may not be a gap between the polishing pad 115 and the platen 105.

In previous processing procedures, after removing the worn-out polish pad, a human operator may visually inspect the upper surface of the platen 105 to identify locations of the residue glue, and may manually remove the residue glues at the identified locations. However, since the residue glue may be difficult to identify through naked eyes, some portions of the residue glue may still be left on the upper surface of the platen 105, thus may cause performance degradation of the CMP tool. Various embodiments of the present disclosure allow for easy identification of the locations of the residue glue on the platen, thus allowing for a complete removal of the residue glue.

Figure 4:
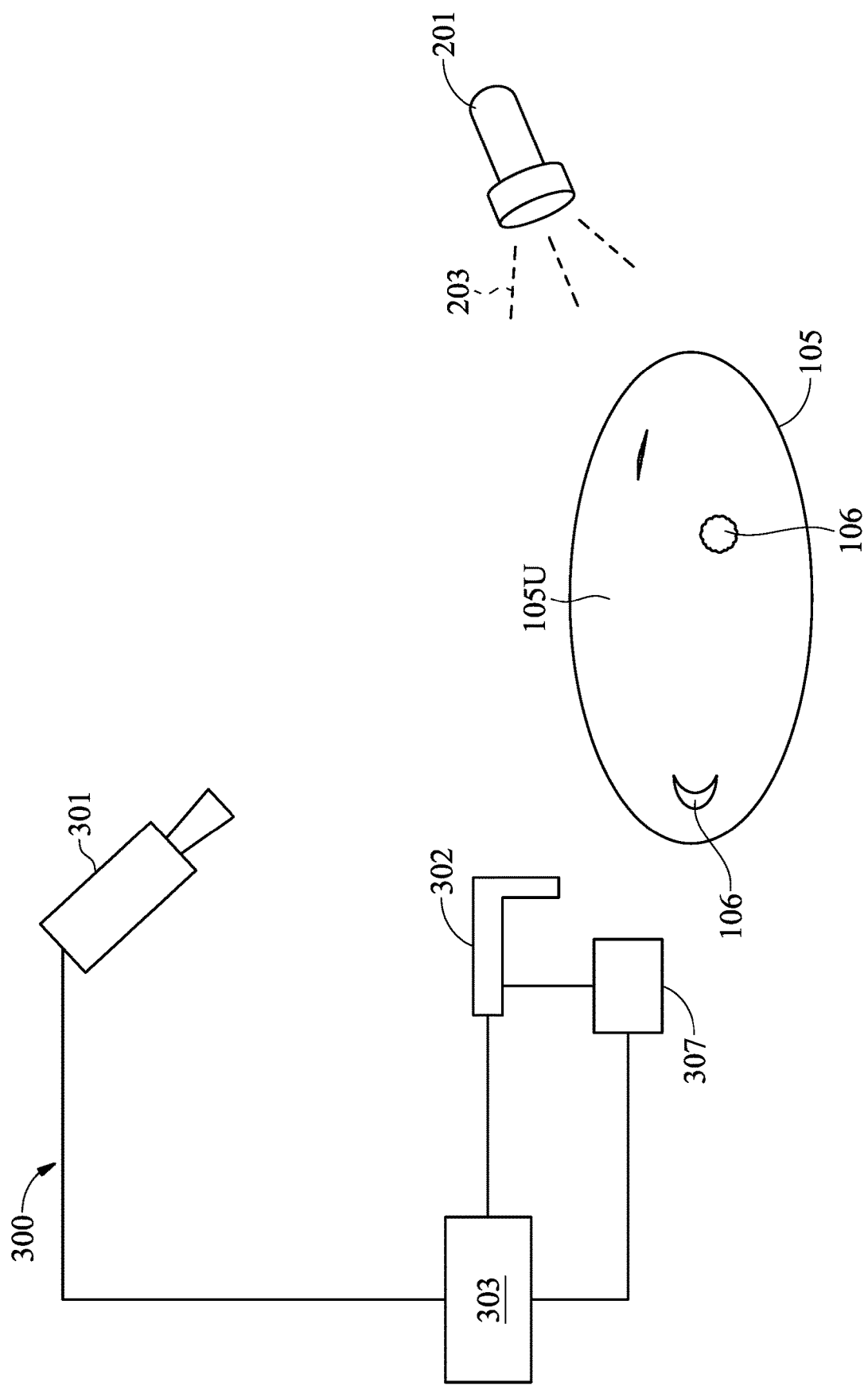
FIG. 4 illustrates a method of identifying locations of residue glue on a platen of a CMP tool, in accordance with an embodiment.

FIG. 4 illustrates a method of identifying residue glue on the platen 105 of the CMP tool 100 of FIG. 1, in accordance with an embodiment. Note that for clarity, not all features of the CMP tool 100 is shown in FIG. 4. FIG. 4 illustrates the platen 105 of the CMP tool after the polishing pad 115 (e.g., a worn-out polishing pad) is removed. FIG. 4 also illustrates residue glue 106 on the upper surface 105U of the platen 105.

In the embodiment of FIG. 4, the glue comprises a fluorescent material that emits a light (e.g., a visible light) when exited by an energy source such as another light (e.g., an ultra-violet light, an infra-red light). In some embodiments, the glue is a mixture of an adhesive material and a fluorescent material. The adhesive material functions to glue the polishing pad 115 to the platen 105, and the fluorescent material helps to identify the locations of the residue glue, as described hereinafter. The adhesive material may be any suitable adhesive, such as a rubber adhesive, an acrylic adhesive, a silicone adhesive, a polyurethane adhesive, the like, or combinations thereof. The fluorescent material may be a suitable fluorescent material such as a carboxylate material, a rare earth material, an $ns^2$ ion material, a migratory ion material, a complex ion material, a II-VII compound (e.g., $SrCl_2$, $BaCl_2$), a II-VI compound (e.g., CdSe, ZnS, PbS, InP), III-V compound (e.g., GaP, GaAs), the like, or combinations thereof.

In some embodiments, a percentage (e.g., volume percentage) of the fluorescent material in the glue is between about 5% and about 10%. If the percentage of the fluorescent material is below about 5%, the amount of light emitted by the fluorescent material may not be strong enough for easy identification of the locations of the residue glue. On the other hand, if the percentage of the fluorescent material is above about 10%, the adhesiveness of the glue may be adversely affected and the polishing pad 115 may not be glued securely on the platen 105.

As illustrated in FIG. 4, to identify the locations of the residue glue 106, a light 203 generated by a light source 201 is projected (e.g., shone) on the upper surface 105U of the platen 105. The light source may be any suitable light source that can produce light 203 to activate the fluorescent material to emit a light. For example, the light source 201 may be a xenon lamp, a halogen lamp, a neon lamp, an LED lamp, an incandescent lamp, or the like. The wavelength of the light 203 is chosen in accordance with the material of the fluorescent material, such that the light 203 is capable of activating the fluorescent material (e.g., in the residue glue 106) for light emission. Example wavelengths of the light 203 include ultra-violet (UV) wavelength (e.g., 10 nm~400 nm), visible light wavelength (e.g., 400 nm~700 nm), near infra-red (NIR) wavelength (e.g., 700 nm~2000 nm), middle infra-red (MIR) wavelength (e.g., 300 nm~5000 nm), far infra-red wavelength (e.g., 8000 nm~14000 nm), or the like.

In the illustrated embodiment, the fluorescent material in the residue glue 106 emits a visible light when the light 203 is shone on the upper surface of the platen 105. The wavelength of the emitted light from the fluorescent material is different from the wavelength of the light 203, in some embodiments. For example, yttrium aluminum garnet (YAG) (a rare earth type fluorescent material) emits a yellow light (e.g., with a wavelength of about 600 nm) when activated by a blue light (e.g., with a wavelength between about 445 nm and 475 nm). As another example, carboxylate fluorescent materials, such as sodium tungstate, sodium borate, sodium citrate, or sodium phosphate, emit light with various neon light colors when activated by a UV light (e.g., with a wavelength of 253.7 nm).

Areas on the upper surface 105U of the platen 105 without the residue glue 106 do not emit the light from the fluorescent material, and therefore, locations of the residue glue 106 are easily identified by, e.g., a human operator using naked eyes. Once the locations of the residue glue 106 are identified, a spot cleaning process may be performed to remove the residue glue 106. In some embodiments, the glue is a polarized polymer material, and a polarized cleaning fluid (e.g., a cleaning fluid comprising a polarized material) is used to remove the residue glue 106. In some embodiments, the spot cleaning process dispenses the cleaning fluid at the identified locations of the residue glue 106 to quickly remove the residue glue 106. Since the cleaning fluid does not need to be dispensed to the entire upper surface of the platen 105, the cost associated with cleaning fluid is reduced by using the spot cleaning process. In addition, the spot cleaning may be finished in a shorter period of time than cleaning the entire upper surface of the platen 105, thus reducing the down time of the CMP tool.

FIG. 4 also illustrates an automatic residue glue removal system 300, which includes an imaging device 301, a processing unit 303, a cleaning nozzle 305, and a mechanical driving unit 307. For simplicity, not all components of the automatic residue glue removal system 300 are illustrated. For example, cleaning fluid supply tanks and valves connected to the cleaning nozzle 305 are not illustrated.

In some embodiments, the imaging device 301 captures an image of the upper surface 105U of the platen 105 while the light 203 is projected on the upper surface 105U, which image shows light patterns of the upper surface 105U. For example, by using a light filter and/or an image sensor that is selective to the wavelength(s) of the light emitted by the fluorescent material, the imaging device 301 may capture light patterns showing locations of the residue glue 106 as bright areas (e.g., having higher light intensities or higher brightness) and other locations (without the residue glue 106) as darker areas (e.g., having lower light intensities or lower brightness). Note that the term "selective" here means that the light filter is a band pass filter that allows light components within a pre-determined spectrum band to pass through, or that the image sensor is designed to capture light components within the pre-determined spectrum band.

The processing unit 303 processes the captured image from the imaging device 301 and identifies the locations of the residue glue 106. For example, the processing unit 303 may use image processing algorithms to identify boundaries of the bright areas (with the residue glue 106). The processing to identify the locations of the residue glue 106 may include: computing an average brightness value of the captured image (light patterns), which average brightness value may be dominated by the values of the dark areas (without residue glue 106), determining a threshold that deviates from the average brightness value by a pre-determined amount (e.g., a threshold above the average brightness value by a pre-determined percentage), and comparing the brightness of the capture image with the threshold. Areas with brightness higher than the threshold may be determined as areas within the boundaries of the residue glue 106. The above process is merely an example and not limiting. Other processing algorithms are also possible, and are fully intended to be included within the scope of the present disclosure.

In the example of FIG. 4, once the locations of the residue glue 106 are determined, the processing unit 303 controls the mechanical driving unit 307 to move the cleaning nozzle 305, and the cleaning nozzle 305 is moved to (e.g., sequentially) the identified locations of the residue glue 106 for the spot cleaning process. For example, the cleaning nozzle 305 may be driven by the mechanical driving unit 307 to move horizontally across the surface of the platen 105 and to move up and down vertically. After a first identified location of the residue glue 106 is cleaned, the cleaning nozzle 305 is moved to a second identified location of the residue glue 106 for cleaning.

Figure 5:
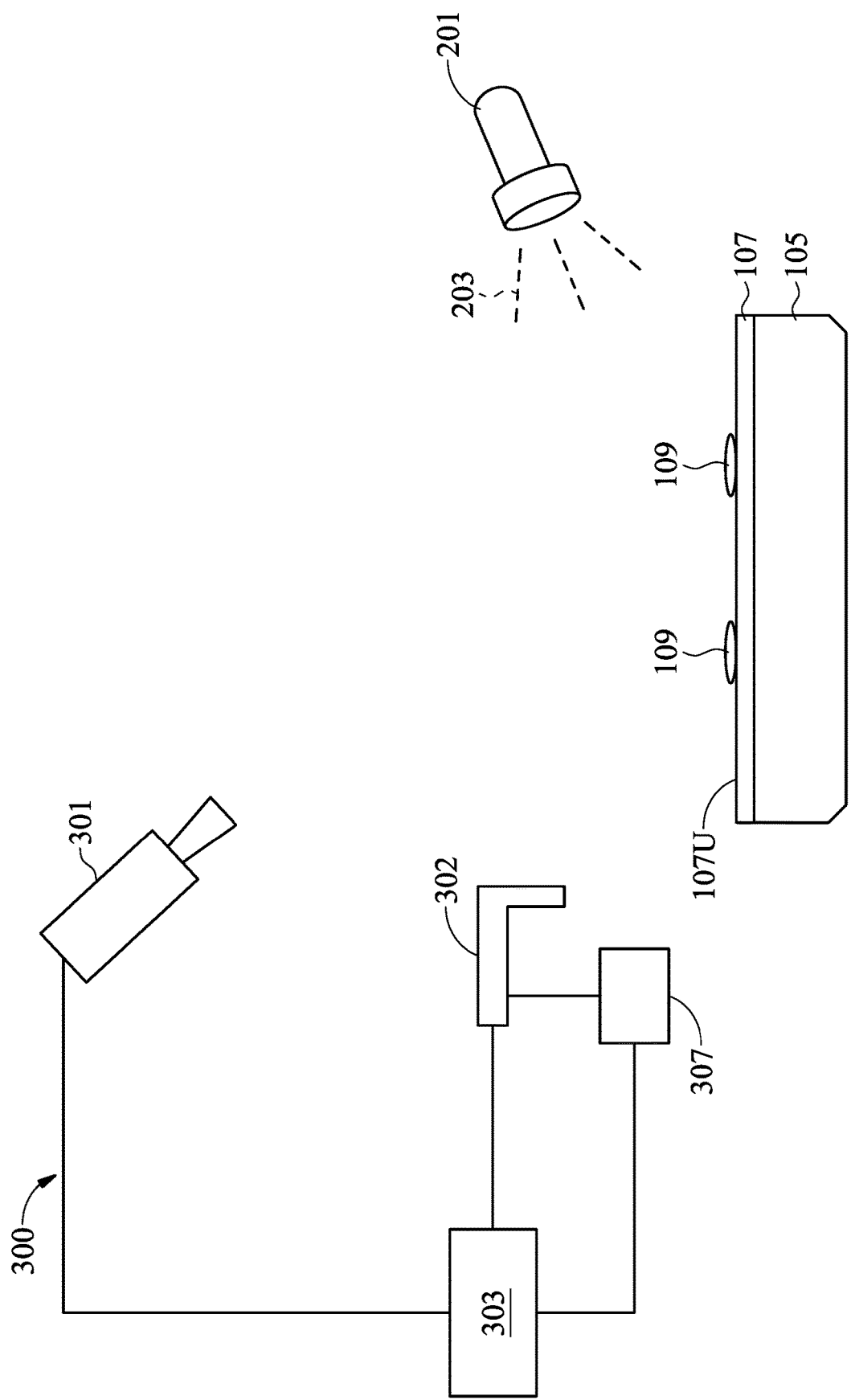
FIG. 5 illustrates a method of identifying locations of residue glue on a platen of a CMP tool, in accordance with another embodiment.

FIG. 5 illustrates a method of identifying residue glue on a platen of a CMP tool, in accordance with another embodiment. In the example of FIG. 5, the platen 105 has a coating 107 formed thereon. In other words, the entire upper surface 105U of the platen 105 is covered by the coating 107. The coating 107 is formed using a fluorescent material, which may be any of the fluorescent material discussed above with reference to FIG. 4.

In the embodiment of FIG. 5, the glue used to attach the polishing pad to the platen 105 does not include a fluorescent material. When a worn out polishing pad is removed from the upper surface 105U of the platen 105, residue portions of the glue, referred to as residue glue 109, are left on the upper surface 107U of the coating 107. To identify the locations of the residue glue 109, a light source 201 projects a light 203 on the coating 107. The light source 201 and the wavelength(s) of the light 203 are chosen in accordance with the fluorescent material of the coating 107. Details are the same as or similar to those discussed above, thus not repeated here.

When the light 203 is projected on the coating 107, areas of the upper surface 107U not covered by the residue glue 109 emits a light (e.g., a visible light). Areas of the upper surface 107U covered by the residue glue 109 may not emit the light, e.g., due to the residue glue 109 being opaque and blocking the light 203, in some embodiments. In other embodiments, the residue glue 109 may be semi-transparent and may allow a fraction of the light 203 to pass through and excite the underlying fluorescent material in the coating 107. However, the light emitted by the underlying fluorescent material is absorbed, refracted, and/or diffused by the residue glue 109, and therefore, the areas of the upper surface 107U with the residue glue 109 have different light patterns than areas without the residue glue 109. For example, locations with the residue glue 109 may appear darker (e.g., having lower light intensities) than other locations, or may not emit a light with a specific color while other locations of the upper surface 107U emit the light with the specific color.

The differences in light patterns between areas with and without residue glue 109 are easily recognized by, e.g., a human operator, to identify locations of the residue glue 109, and a spot cleaning process is performed to clean the residue glue 109 at the identified locations. In some embodiments, the fluorescent material (e.g., the coating 107) is a non-polarized material, and the glue (e.g., residue glue 109) is a polarized polymer material with C—H chain, and therefore, a polarized cleaning fluid (e.g., a cleaning fluid comprising a polarized material) is used to remove the residue glue 109 without removing/damaging the coating 107.

FIG. 5 further illustrates an automatic residue glue removal system 300, which is the same as or similar to that of FIG. 4. The imaging device 301 captures an image of the upper surface 107U of the coating 107 while the light 203 is shone on the upper surface 107U. The captured image shows the light patterns of the upper surface 107U, where areas without the residue glue 109 appear as bright areas and areas with the residue glue 109 appear as darker areas, in some embodiments. The processing algorithms of the processing unit 303 may be designed to detect the boundaries of the darker areas in the light patterns in order to detect the locations of the residue glue 109. The processing to identify the locations of the residue glue 109 may include: computing an average brightness value of the captured image (light patterns), which average brightness value may be dominated by the values of the bright areas (without residue glue 109), determining a threshold that deviate from the average brightness value by a pre-determined amount (e.g., a threshold below the average brightness value by a pre-determined percentage), and comparing the brightness of the capture image with the threshold. Areas with brightness lower than the threshold may be considered as areas within the boundaries of the residue glue 109. As another example, since the light patterns of areas without the residue glue 109 are relatively uniform (e.g., having a uniform high brightness value), the image processing algorithm may identify the boundaries of the residue glue 109 by finding transition boundaries in the light patterns. For example, if an area in the image has a brightness that differs from neighboring areas by a pre-determined percentage, the area may be considered as part of the boundary of the residue glue 109. The above examples are illustrative and not limiting. Other processing algorithms are also possible, and are fully intended to be included within the scope of the present disclosure.

Variations to the various embodiments are possible and are fully intended to be included within the scope of the present disclosure. For example, the fluorescent material, after being activated, may emit an invisible light (instead of a visible light) that is different (e.g., having different wavelength) from the light 203. The human operator may wear a special goggle to see the light patterns of the invisible light. In embodiment where the automatic glue removal system 300 is used, the imaging device 301 may be designed to be selective to the light (invisible light or visible light) emitted by the fluorescent material. As another example, the fluorescent material may be replaced by any suitable material that emits a light with a pre-determined wavelength that is detectable and distinguishable from the light 203.

Embodiment may achieve advantages. For example, the disclosed embodiments allow for easy identification of the locations of residue glue, which leads to better cleaning of the residue glue, improved planarity of the polishing pad, and improved polishing results of the CMP tool. By using spot cleaning, the CMP tool down time is reduced, and the cost associated with the cleaning fluid is reduced. The disclosed automatic residue glue removal system 300 may increase efficiency even more by automating the cleaning process.

Figure 6:
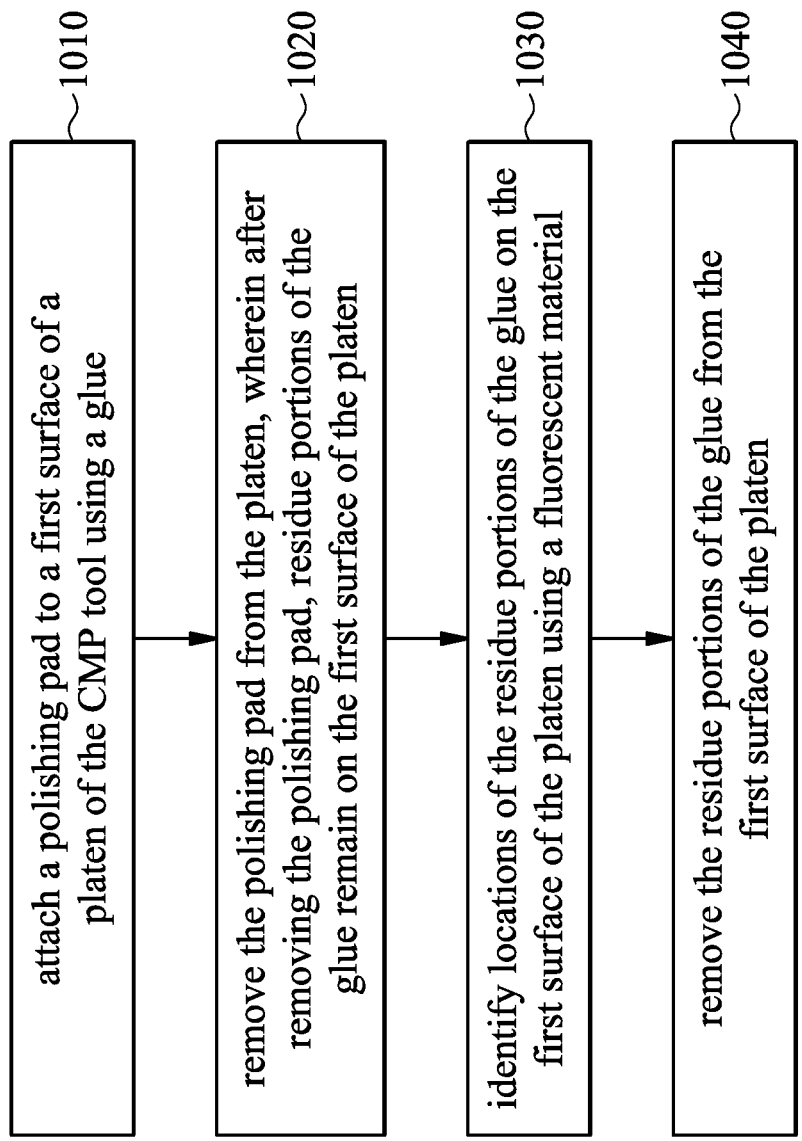
FIG. 6 illustrates a flow chart of a method of operating a CMP tool, in accordance with some embodiments.

FIG. 6 illustrates a flow chart of a method 1000 of operating a CMP tool, in accordance with some embodiments. It should be understood that the embodiment method shown in FIG. 6 is merely an example of many possible embodiment methods. One of ordinary skill in the art would recognize many variations, alternatives, and modifications. For example, various steps as illustrated in FIG. 6 may be added, removed, replaced, rearranged and repeated.

Referring to FIG. 6, at step 1010, a polishing pad is attached to a first surface of a platen of the CMP tool using a glue. At step 1020, the polishing pad is removed from the platen, wherein after removing the polishing pad, residue portions of the glue remain on the first surface of the platen. At step 1030, locations of the residue portions of the glue on the first surface of the platen are identified using a fluorescent material. At step 1040, the residue portions of the glue are removed from the first surface of the platen.

In accordance with an embodiment, a method of operating a chemical mechanical planarization (CMP) tool includes attaching a polishing pad to a first surface of a platen of the CMP tool using a glue; removing the polishing pad from the platen, wherein after removing the polishing pad, residue portions of the glue remain on the first surface of the platen; identifying locations of the residue portions of the glue on the first surface of the platen using a fluorescent material; and removing the residue portions of the glue from the first surface of the platen. In an embodiment, removing the residue portions of the glue comprises spot-cleaning the first surface of the platen at the identified locations to remove the residue portions of the glue. In an embodiment, the method further includes attaching another polishing pad to the first surface of the platen after removing the residue portions of the glue. In an embodiment, the glue comprises an adhesive material and the fluorescent material, wherein identifying locations of the residue portions of the glue comprises: shining a first light on the first surface of the platen after removing the polishing pad, the first light capable of exciting the fluorescent material to emit a second light; and detecting regions on the first surface of the platen that emit the second light. In an embodiment, a percentage of the fluorescent material in the glue is between about 5% and about 10%. In an embodiment, the first surface of the platen is coated with the fluorescent material, wherein identifying locations of the residue portions of the glue comprises: shining a first light on the first surface of the platen after removing the polishing pad, the first light capable of exciting the fluorescent material to emit a second light; capturing an image of the first surface of the platen, the image indicating a light intensity of the second light; and identifying regions on the first surface of the platen with a light intensity of the second light that is different from an average light intensity of the second light. In an embodiment, the glue comprises a polarized material, and the fluorescent material comprises a non-polarized material, wherein removing the residue portions of the glue is performed using a polarized cleaning fluid. In an embodiment, identifying locations of the residue portions of the glue comprises: projecting a first light on the first surface of the platen, the first light exciting the fluorescent material to emit a second light; capturing light patterns of the first surface of the platen; and processing the captured light patterns to identify a first region of the first surface of the platen having a first light pattern that deviates from an average light pattern of the first surface of the platen by a pre-determined amount. In an embodiment, capturing light patterns comprises capturing light patterns of the first surface of the platen using an imaging device. In an embodiment, the imaging device is selective to the second light. In an embodiment, processing the captured light patterns comprises: calculating the average light pattern of the first surface of the platen; determining a threshold based on the calculated average light pattern; and comparing light patterns of different regions on the first surface of the platen with the threshold.

In accordance with an embodiment, a method of operating a chemical mechanical planarization (CMP) tool includes attaching a polishing pad to a first surface of a platen of the CMP tool using a glue, the first surface of the platen covered by a coating comprising a fluorescent material; detaching the polishing pad from the platen, wherein detaching the polishing pad leaves a residue portion of the glue on the coating; projecting a first light on the coating after detaching the polishing pad, the first light exciting the fluorescent material to emit a second light; and identifying a first region of the coating over which the residue portion of the glue is disposed, the first region having a first light intensity different from a second light intensity of neighboring regions of the coating. In an embodiment, the glue has a different composition from the fluorescent material. In an embodiment, the first light intensity is lower than the second light intensity. In an embodiment, the method further comprises spot-cleaning the residue portion of the glue by dispensing a cleaning fluid in the first region of the coating on the first surface of the platen; and attaching a replacement polishing pad to the first surface of the platen after the spot-cleaning. In an embodiment, the glue comprises a first polarized material, the fluorescent material comprises a non-polarized material, and the cleaning fluid comprises a second polarized material.

In accordance with an embodiment, a method of operating a chemical mechanical planarization (CMP) tool includes attaching a polishing pad to a first surface of a platen of the CMP tool using a glue that comprises a fluorescent material; removing the polishing pad from the platen, wherein after removing the polishing pad, residue portions of the glue are left on the first surface of the platen; projecting a first light on the first surface of the platen after removing the polishing pad, the first light capable of exciting the fluorescent material to emit a second light; detecting the second light at one or more locations on the first surface of the platen; and removing the residue portions of the glue from the one or more locations on the first surface of the platen. In an embodiment, removing residue portions of the glue comprises spot-cleaning the one or more locations on the first surface of the platen. In an embodiment, the glue is a mixture of an adhesive material and the fluorescent material, wherein a volume percentage of the fluorescent material in the glue is between about 5% and about 10%. In an embodiment, the adhesive material is a rubber adhesive, an acrylic adhesive, a silicone adhesive, or a polyurethane adhesive, and the fluorescent material is a carboxylate material, a rare earth material, an $ns^2$ ion material, a migratory ion material, a complex ion material, a II-VII compound, a II-VI compound, or a III-V compound.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of operating a chemical mechanical planarization (CMP) tool, the method comprising:
    attaching a polishing pad to a first surface of a platen of the CMP tool using a glue;
    removing the polishing pad from the platen, wherein after removing the polishing pad, residue portions of the glue remain on the first surface of the platen;
    identifying locations of the residue portions of the glue on the first surface of the platen using a fluorescent material, wherein identifying locations of the residue portions of the glue comprises:
        projecting a first light on the first surface of the platen, the first light exciting the fluorescent material to emit a second light;
        capturing light patterns of the first surface of the platen; and
        processing the captured light patterns to identify a first region of the first surface of the platen having a first light pattern that deviates from an average light pattern of the first surface of the platen by a pre-determined amount; and
    removing the residue portions of the glue from the first surface of the platen.

2. The method of claim 1, wherein removing the residue portions of the glue comprises spot-cleaning the first surface of the platen at the identified locations to remove the residue portions of the glue.

3. The method of claim 1, further comprising attaching another polishing pad to the first surface of the platen after removing the residue portions of the glue.

4. The method of claim 1, wherein the glue comprises an adhesive material and the fluorescent material, wherein identifying locations of the residue portions of the glue comprises:
    shining the first light on the first surface of the platen after removing the polishing pad, the first light capable of exciting the fluorescent material to emit the second light; and
    detecting regions on the first surface of the platen that emit the second light.

5. The method of claim 4, wherein a percentage of the fluorescent material in the glue is between about 5% and about 10%.

6. The method of claim 1, wherein the first surface of the platen is coated with the fluorescent material, wherein identifying locations of the residue portions of the glue comprises:
    shining the first light on the first surface of the platen after removing the polishing pad, the first light capable of exciting the fluorescent material to emit the second light;
    capturing an image of the first surface of the platen, the image indicating a light intensity of the second light; and
    identifying regions on the first surface of the platen with a light intensity of the second light that is different from an average light intensity of the second light.

7. The method of claim 6, wherein the glue comprises a polarized material, and the fluorescent material comprises a non-polarized material, wherein removing the residue portions of the glue is performed using a polarized cleaning fluid.

8. The method of claim 1, wherein capturing light patterns comprises capturing light patterns of the first surface of the platen using an imaging device.

9. The method of claim 8, wherein the imaging device is selective to the second light.

10. The method of claim 1, wherein processing the captured light patterns comprises:
    calculating the average light pattern of the first surface of the platen;
    determining a threshold based on the calculated average light pattern; and
    comparing light patterns of different regions on the first surface of the platen with the threshold.

11. A method of operating a chemical mechanical planarization (CMP) tool, the method comprising:
    attaching a polishing pad to a first surface of a platen of the CMP tool using a glue, the first surface of the platen covered by a coating comprising a fluorescent material;
    detaching the polishing pad from the platen, wherein detaching the polishing pad leaves a residue portion of the glue on the coating;

projecting a first light on the coating after detaching the polishing pad, the first light exciting the fluorescent material to emit a second light; and identifying a first region of the coating over which the residue portion of the glue is disposed, the first region having a first light intensity different from a second light intensity of neighboring regions of the coating.

12. The method of claim 11, wherein the glue has a different composition from the fluorescent material.

13. The method of claim 11, wherein the first light intensity is lower than the second light intensity.

14. The method of claim 11, further comprising:

spot-cleaning the residue portion of the glue by dispensing a cleaning fluid in the first region of the coating on the first surface of the platen; and attaching a replacement polishing pad to the first surface of the platen after the spot-cleaning.

15. The method of claim 14, wherein the glue comprises a first polarized material, the fluorescent material comprises a non-polarized material, and the cleaning fluid comprises a second polarized material.

16. A method of operating a chemical mechanical planarization (CMP) tool, the method comprising:

attaching a polishing pad to a first surface of a platen of the CMP tool using a glue that comprises a fluorescent material;

removing the polishing pad from the platen, wherein after removing the polishing pad, residue portions of the glue are left on the first surface of the platen;

projecting a first light on the first surface of the platen after removing the polishing pad, the first light capable of exciting the fluorescent material to emit a second light;

capturing light patterns of the first surface of the platen using an imaging device;

processing the captured light patterns from the imaging device to identify one or more locations on the first surface of the platen having light patterns that deviate from an average light pattern of the first surface of the platen by a pre-determined amount; and removing the residue portions of the glue from the one or more locations on the first surface of the platen.

17. The method of claim 16, wherein removing residue portions of the glue comprises spot-cleaning the one or more locations on the first surface of the platen.

18. The method of claim 16, wherein the glue is a mixture of an adhesive material and the fluorescent material, wherein a volume percentage of the fluorescent material in the glue is between about 5% and about 10%.

19. The method of claim 18, wherein the adhesive material is a rubber adhesive, an acrylic adhesive, a silicone adhesive, or a polyurethane adhesive, and the fluorescent material is a carboxylate material, a rare earth material, an $ns^2$ ion material, a migratory ion material, a complex ion material, a II-VII compound, a II-VI compound, or a III-V compound.

20. The method of claim 16, wherein removing the residue portions of the glue comprises:

moving, using a mechanical driving unit controlled by a processing unit, a cleaning nozzle above the one or more locations on the first surface of the platen; and dispensing, through the cleaning nozzle, a cleaning fluid on the one or more locations on the first surface of the platen.

* * * * *